G. F. HAINES.
TRANSMISSION GEARING.
APPLICATION FILED SEPT. 13, 1912.
1,069,004. Patented July 29, 1913.
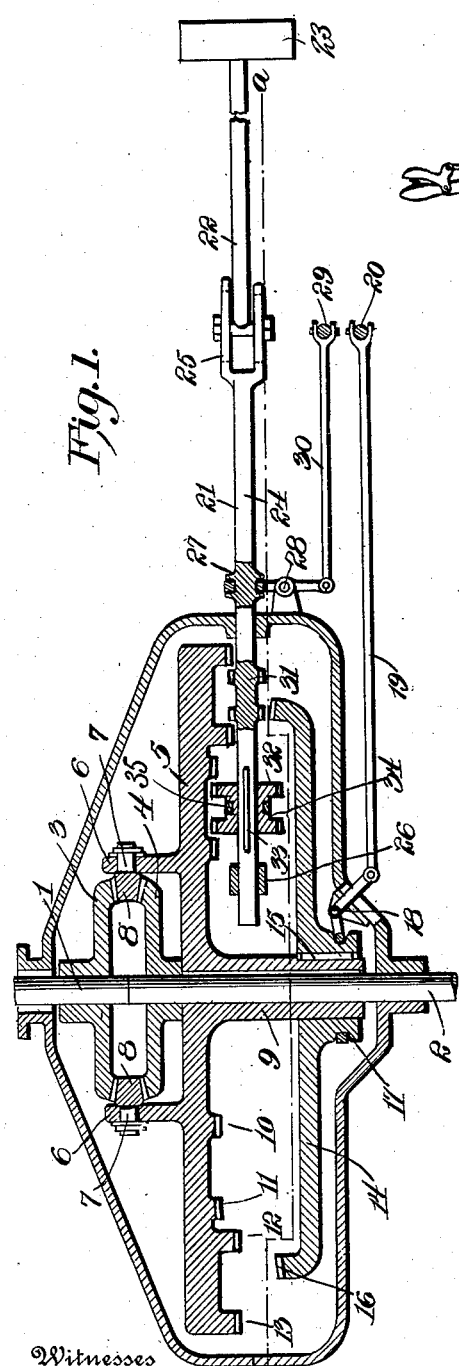
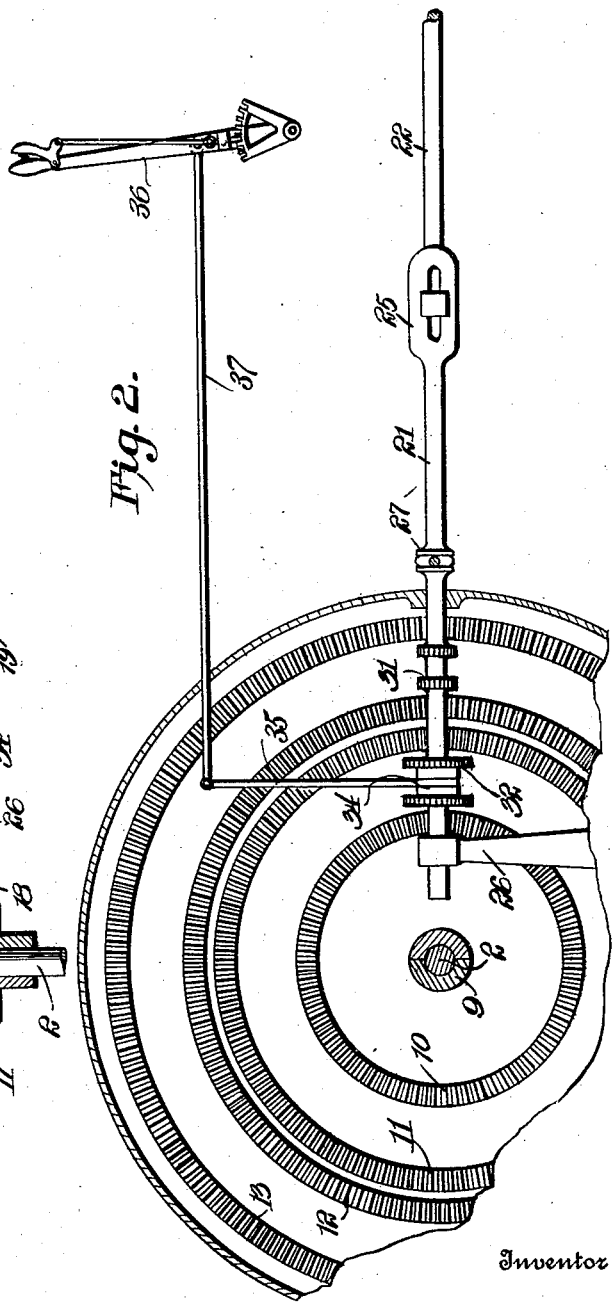
Witnesses
Inventor
Gerald F. Haines
By Victor J. Evans
Attorney

UNITED STATES PATENT OFFICE.

GERALD F. HAINES, OF ROSEBANK, NEW YORK.

TRANSMISSION-GEARING.

1,069,004.   Specification of Letters Patent.   Patented July 29, 1913.

Application filed September 13, 1912. Serial No. 720,249.

*To all whom it may concern:*

Be it known that I, GERALD F. HAINES, a citizen of the United States, residing at Rosebank, in the county of Richmond and State of New York, have invented new and useful Improvements in Transmission-Gearing, of which the following is a specification.

This invention is an improved transmission gearing for use on automobiles and also for use on machinery of various kinds for transmitting power from a driving shaft to a driven shaft and causing the speed of the driven shaft to be varied at will and to also enable the direction of rotation of the driven shaft to be reversed, the invention consisting in the construction, combination and arrangement of devices hereinafter described and claimed.

In the accompanying drawing:—Figure 1 is partly a plan and partly a horizontal sectional view of a transmission gear constructed in accordance with my invention. Fig. 2 is a vertical sectional view of the same on the plane indicated by the line $a$—$a$ of Fig. 1.

The members of the rear axle shaft which is the driven shaft are indicated at 1—2 and are, respectively, provided with transmission gears 3—4 which are arranged facing each other and are here shown as bevel gears. A master gear 5 is mounted on the driven shaft member 2 for rotation and is provided on one side with arms or projections 6 having stub shafts 7 which are radial to the driven shaft and on the said stub shafts are mounted pinions 8 which are arranged between and engage the spurs or teeth of the transmission gears 3—4. The master gear is provided on opposite sides with a sleeve 9 which forms the hub element thereof and is also provided on the same side with eccentrically arranged crown gear teeth 10, 11, 12 and 13. The crown gear teeth 10—11 are in the same plane and the crown gear teeth 12—13 are in a different plane. A reversing gear 14 is secured to the hub sleeve 9 as by means of a spline 15 which permits movement of said reversing gear toward and from the master gear and also causes the reversing gear to revolve with the master gear. The reversing gear is provided with crown teeth 16 arranged about midway between the crown teeth 12—13 of the master gear and is also provided with a grooved hub 17, the groove of which is engaged by a shifter 18 which is operated by a lever 19, the said shifter being connected to the said lever by a suitable rod 20.

The driving or motor shaft 21 comprises a member 22 which, in practice, has the usual crank or cranks and also a fly wheel 23 and a longitudinally movable member 24 which is connected to and rotated by the said member 22 by a suitable coupling or connection which while enabling the member 24 to be rotated with and by the member 22 also enables said member 24 to be adjusted longitudinally. This coupling is here indicated at 25.

Bearings for the longitudinally movable driving shaft member 24 are indicated at 26 and the said driving shaft member 24 is provided with a curved collar 27 engaged by a shifter 28 which is operated by a suitable lever 29, a rod 30 connecting the said lever with the said shifter. A pinion 31 is fixed on the longitudinally movable driving shaft member 24 and is of such diameter and is so located on said shaft as to enable it to be engaged either with the teeth 12 or the teeth 13 of the master gear by longitudinally shifting the said shaft member 24, as will be understood. A larger pinion 32 is mounted on the driving shaft member 24 for longitudinal movement and connected thereto by a spline 33, the said pinion 32 being shiftable independently of the said driving shaft member 24 and being adapted to be engaged either with the crown teeth 10 or the crown teeth 11 of the master gear 5. This shiftable pinion 32 is provided with a grooved hub 34 engaged by a shifter 35, said shifter being operated by a lever 36 and being engaged with said lever by a suitable shifter rod 37.

When the pinions 31—32 are out of engagement with the concentric series of crown teeth of the master gear, the latter, and, hence, the driven shaft remains stationary while the driving shaft may be revolved by the operation of the motor. To start the driven shaft in operation, the driving shaft member 24 should be moved longitudinally to engage the pinion 31 with the largest series of crown teeth 13 so that the master gear and the driving shaft will be revolved at minimum speed. To increase the speed of the driven shaft, the shaft element 25 should be shifted to disengage its pinion 31 from the teeth 13 and engage it with the teeth 12. To still further increase the speed, the pinion 32 must be shifted to engage with the crown teeth 11 and to drive the driven shaft at the highest rate of speed, the said pinion 32 must be shifted into engagement with the crown teeth 10. It will be understood that before engaging the pinion 32 with either series of crown teeth 10 or 11, the pinion 31 must be shifted out of engagement with both the series of crown teeth 12—13. In order to reverse the driven shaft, the pinions of the driving shaft member 24 must be disengaged from the crown teeth of the master gear and the pinion 31 arranged opposite the teeth 16 of the reversing gear 14 and the said reversing gear then moved toward the master gear so as to cause its crown teeth to be engaged by the said pinion 31.

While I have herein shown and described a preferred form of my invention, I would have it understood that changes may be made in the form, proportion and construction of the several parts without departing from the spirit of my invention and within the scope of the appended claims.

I claim:—

1. In a transmission gearing of the class described, the combination of a driven element having a master gear provided with a plurality of pairs of concentric crown teeth, each pair of crown teeth of said gear being in a different plane from that of another pair, a driving shaft, and pinions on said driving shaft respectively adapted to be engaged with either member of either pair of concentric crown teeth of the master wheel.

2. In a transmission gearing of the class described, the combination of a driven element having a master gear provided with a plurality of pairs of concentric crown teeth, each pair of crown teeth of said gear being in a different plane from that of another pair, a driving shaft, pinions on said driving shaft respectively adapted to be engaged with either member of either pair of concentric crown teeth of the master wheel, the said driving shaft having a longitudinally movable member, one of the pinions being fixed on and longitudinally movable with said shaft member, the other pinion being connected to the said shaft member for revolution therewith and for longitudinally shifting the said shaft member, and means to independently and longitudinally shift the last-mentioned pinion.

3. In a transmission gearing of the class described, the combination of a driven member having a master gear and a reversing gear mounted thereon, spaced apart and provided on their opposing sides with crown teeth arranged out of line, a driving shaft, a pinion on said driving shaft adapted to be engaged with either series of crown teeth of the master gear and to be arranged between and out of engagement therewith, and means to shift the reversing gear toward and from the master gear to engage the same with or disengage the same from said pinion of the driving shaft.

In testimony whereof I affix my signature in presence of two witnesses.

GERALD F. HAINES.

Witnesses:
 JAMES G. MEERS,
 JOHN J. ROEHRIG.

---

Copies of this patent may be obtained for five cents each, by addressing the "Commissioner of Patents, Washington, D. C."